United States Patent

Randall et al.

[15] 3,699,195
[45] Oct. 17, 1972

[54] PRODUCTION OF DIESTERS OF 2-HYDROXYETHYLPHOSPHONIC ACID

[72] Inventors: David I. Randall; Calvin Vogel, both of Easton, Pa.

[73] Assignee: GAF Corporation, New York, N.Y.

[22] Filed: Aug. 7, 1969

[21] Appl. No.: 848,340

[52] U.S. Cl............260/970, 260/502.4 R, 260/953
[51] Int. Cl.............................C07f 9/38, C07f 9/40
[58] Field of Search......................................260/970

[56] References Cited

UNITED STATES PATENTS 3,491,151  1/1970  Bader.....................260/584 C
3,081,333  3/1963  Renner...................260/970 X Primary Examiner—Joseph Rebold
Assistant Examiner—Richard L. Raymond
Attorney—Samson B. Leavitt and Walter C. Kehm

[57] ABSTRACT

Process for the production of diesters of 2-hydroxyethylphosphonic acid by reaction of alkali metal salts of secondary phosphites and ethylene oxide wherein the reaction is conducted in the presence of an aprotic, dipolar solvent in which the dipole moment of the solvent is 3.5 Debye units or greater. Such diesters are useful as intermediates for the production of the plant stimulant 2-chloroethylphosphonic acid.

11 Claims, No Drawings

PRODUCTION OF DIESTERS OF 2-HYDROXYETHYLPHOSPHONIC ACID

BACKGROUND OF THE INVENTION

1. Field of the Invention

This invention relates to a process for the preparation of diesters of 2-hydroxyethylphosphonic acid by the reaction of alkali metal salts of secondary phosphites and ethylene oxide.

2. Description of the Prior Art

The product, 2-chloroethylphosphonic acid, has come to be recognized as a valuable material in the agricultural area as a plant stimulant. However, in order that this product may be used, it must be prepared in substantially pure form to minimize the toxicity normally encountered with halogenated products. Formation of this product in sufficiently pure form from available starting materials in the purity necessary has heretofore been exceedingly difficult. Accordingly, there is a distinct need in the art for intermediates from which this valuable product may be prepared in substantially pure form.

One intermediate which is convertible to the desired 2-chloroethylphosphonic acid are the diesters of 2-hydroxyethylphosphonic acid which may be easily converted to the 2-chloroethylphosphonic acid by treatment with hydrogen chloride at a temperature of about 110° to 140° C. with an acid concentration of about 20–37 percent and under autogenous pressure. However, in the art, this intermediate has not been capable of preparation in sufficient yields to be commercially desirable. Thus, an article by A. N. Pudovik et al., Invest. Akad. Nauk S.S.S.R. Otdel. Khim Nauk., p. 947–955, (1952), indicates that when the sodium salt of a secondary phosphite is treated with ethylene oxide in diethyl ether solvent, only traces of desired product are isolated and raising the temperature fails to improve the yield. In addition, there is only a slight improvement of yield if the reaction is conducted in the presence of a $BF_3$· etherate. Accordingly, the art is not aware of any process by which these valuable diethyl esters of 2-hydroxyethylphosphonic acid may be prepared in good yields and good purities.

SUMMARY OF THE INVENTION

It is accordingly one object of this invention to provide a process for the preparation of substantially pure diesters of 2-hydroxyethylphosphonic acid.

A further object of the invention is to prepare diesters of 2-hydroxyethylphosphonic acid by the reaction of secondary phosphites and ethylene oxide wherein the reaction is conducted in the presence of an aprotic, dipolar solvent.

Other objects and advantages of the present invention will become apparent as the description thereof proceeds.

In satisfaction of the foregoing objects and adavantages, there is provided by this invention a process for the preparation of diesters of 2-hydroxyethylphosphonic acid by the reaction of an alkali metal salt of a secondary phosphite and ethylene oxide wherein the reaction is conducted in the presence of an aprotic, dipolar solvent in which the dipole moment is 3.5 Debye units or greater.

DESCRIPTION OF PREFERRED EMBODIMENTS

The process with which this invention is concerned comprises the reaction of an alkali metal salt of a secondary phos-phite with ethylene oxide. This reaction may be described by the following equation:

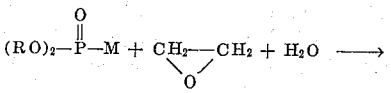

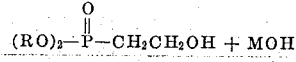

wherein, in the above equation, M is an alkali metal such as sodium, potassium, or lithium but preferably sodium, and R is an alkyl group of one to about seven carbon atoms, preferably methyl, haloalkyl of one to seven carbon atoms, cycloalkyl of five to seven carbon atoms, alkenyl of two to seven carbon atoms or aryl of six to 12 carbon atoms.

It has been discovered that this reaction may be conducted so as to obtain high yields of substantially pure product if the reaction is conducted in the presence of an aprotic, dipolar solvent in which the dipolar moment is 3.5 Debye units or greater. Suitable solvents which have been discovered to conform to this requirement and to be suitable for conducting the reaction include the N-alkyl lactams such as N-methyl-2-pyrrolidone, N-methyl-2-piperidone, dimethylformamide, dimethylacetamide, dimethyl sulfoxide, hexamethylphosphoramide, sulfolane and mixtures thereof. Obviously equivalent materials conforming to the definition may also be employed.

The alkali metal salts of the secondary phosphites employed as one of the reactants in the process may be prepared in any desired manner but are preferably prepared in situ. In this in situ method, a secondary phosphite such as that of the formula:

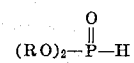

wherein R is as defined above, in the requirement amount, is initially dissolved in the selected solvent at room temperature and thereafter an equivalent amount of the desired alkali metal is added to the solution. As the alkali metal form is generally known to be flammable, it is highly desirable that the solvent be dried prior to initiation of the reaction. After the alkali metal salt of the secondary phosphite in the solvent solution is prepared at room temperature, as indicated by cessation of the hydrogen evolution, the ethylene oxide in the stoichiometric amount may then be passed into the reaction mixture at about room temperature. The resulting solution is then stirred for several hours until the reaction is complete, whereupon distillation of the reaction mixture with fractionation will result in the desired product.

Generally, the reaction is conducted under atmospheric pressure and at about room temperature, as these very moderate conditions have been found to be satisfactory for conducting the reaction. A preferred temperature therefore, for conducting the reaction, ranges from about 20° to 50°C.

It is also necessary to add a small amount of water (e.g., about 10 percent by volume of the solvent) to the solution after addition of the ethylene oxide in order to take up the alkali metal ion generated in the second step of the reaction and thereby shift the reaction equilibrium toward the formation of the desired product. This is indicated in the equation set forth above.

The following examples are presented to further illustrate the process of the invention, but the invention is not to be considered as limited thereto.

EXAMPLE I

To a solution of 13.8 grams of diethyl phosphite in 100 ml. of dry N-methyl-2-pyrrolidone was slowly added portionwise, 2.3 grams of sodium. When the evolution of hydrogen had ceased, ethylene oxide was passed into the reaction mixture at 30°C. until 4.4 grams had been added as indicated by an increase in weight in the solution. Thereafter, the solution was stirred for 5 hours at room temperature and then 10 ml. of water was added. The resulting reaction mixture was then fractionally distilled through a two-foot glass helix packed column to result in a good yield of 2-hydroxyethylphosphonic acid, diethyl-ester, b.pt. 125°–130°C.

EXAMPLE II

The reaction of example I was repeated except that the solvent employed was dimethylacetamide in the identical amount. Using the same reaction techniques and conditions, there was recovered a good yield of the desired 2-hydroxyethylphosphonic acid diethyl ester.

The invention has been described herein with reference to certain preferred embodiments but is not to be considered as limited thereto, as obvious variations thereof will become obvious to those skilled in the art.

What is claimed is:

1. A process for the preparation of 2-hydroxyethylphosphonic acid diesters of the formula:

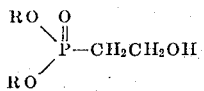

wherein R is $C_{1-7}$ alkyl, $C_{1-7}$ haloalkyl, $C_{5-7}$ cycloalkyl, $C_{2-7}$ alkenyl, or $C_{6-12}$ aryl, by the reaction at about room temperature to 50° C of an alkali metal salt of a secondary phosphite of the formula:

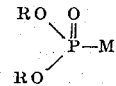

wherein R is as above and M is an alkali metal, with a stoichiometric amount of ethylene oxide in the presence of an aprotic, dipolar solvent in which the dipole moment is 3.5 Debye units or greater.

2. A process according to claim 1 wherein the solvents are selected from the group consisting of N-alkyl-2-lactams, dimethylformamide, dimethylacetamide, dimethyl sulfoxide, hexamethylphosphoramide, sulfolane and mixtures thereof.

3. A process according to claim 1 wherein the reaction is conducted at a temperature of 20° to 50°C.

4. A process according to claim 1 wherein the alkali metal is sodium.

5. A process according to claim 1 wherein a small amount of water is added to the reaction after addition of the ethylene oxide.

6. A process according to claim 1 wherein the solvent is N-methyl-2-pyrrolidone.

7. A process according to claim 1 wherein the solvent is dimethylacetamide.

8. A process according to claim 1 wherein R is ethyl.

9. A process according to claim 1 wherein said alkali metal salt of a secondary phosphite is formed in situ by the addition, to a solution in said solvent of a secondary phosphite of the formula

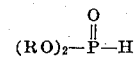

wherein R is as defined in claim 9, of an equivalent amount of alkali metal.

10. A process according to claim 1 wherein R is ethyl, M is sodium, and said solvent is N-methyl-2-pyrrolidone.

11. A process according to claim 1 wherein R is ethyl, M is sodium, and said solvent is dimethylacetamide.

* * * * *